US010033828B2

(12) United States Patent
Garg et al.

(10) Patent No.: US 10,033,828 B2
(45) Date of Patent: Jul. 24, 2018

(54) ASSOCIATING SOCIAL DATA WITH USER PROFILES (71) Applicant: Adobe Systems Incorporated, San Jose, CA (US)

(72) Inventors: Mohit Garg, New Delhi (IN); Pawan Goyal, Noida (IN); Vivek Kumar, Noida (IN); Ankur Jain, Noida (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 197 days.

(21) Appl. No.: 14/180,130

(22) Filed: Feb. 13, 2014

(65) Prior Publication Data
US 2015/0229736 A1 Aug. 13, 2015

(51) Int. Cl.
G06F 15/16 (2006.01)
H04L 29/08 (2006.01)
H04L 12/58 (2006.01)
G06Q 50/00 (2012.01)

(52) U.S. Cl.
CPC .......... *H04L 67/306* (2013.01); *G06Q 50/01* (2013.01); *H04L 51/32* (2013.01)

(58) Field of Classification Search
CPC .............................. G06F 15/16; H04L 67/306
USPC ........................................................ 709/204
See application file for complete search history.

(56) References Cited

U.S. PATENT DOCUMENTS

| | | | | |
|---|---|---|---|---|
| 7,860,889 B1* | 12/2010 | Martino | ............ | G06F 17/3089 707/784 |
| 8,606,643 B2* | 12/2013 | Lawrence | ............ | G06Q 30/02 705/26.1 |
| 8,738,705 B2* | 5/2014 | Kelmenson | ............ | G06Q 50/01 709/205 |
| 8,898,283 B2* | 11/2014 | Zhang | ............ | G06F 17/30867 705/14.54 |
| 8,949,239 B2* | 2/2015 | Ruffner | ........................ | 707/738 |
| 9,146,656 B1* | 9/2015 | Srinivasan | ............ | G06F 3/0482 |
| 9,183,172 B1* | 11/2015 | Anderson | ............ | G06F 15/0291 |
| 2009/0083815 A1* | 3/2009 | McMaster | .......... | H04N 7/17318 725/110 |
| 2011/0208822 A1* | 8/2011 | Rathod | ................. | G06Q 30/02 709/206 |
| 2011/0313996 A1* | 12/2011 | Strauss | ............ | G06Q 30/0242 707/709 |
| 2012/0143816 A1* | 6/2012 | Zhang | ............ | G06F 17/30867 707/607 |
| 2012/0191776 A1* | 7/2012 | Ruffner | ............ | G06F 17/30873 709/204 |
| 2013/0091220 A1* | 4/2013 | Murphy | ............ | H04N 21/2187 709/204 |

(Continued)

Primary Examiner — Philip B Tran
(74) Attorney, Agent, or Firm — Wolfe-SBMC (57) ABSTRACT This document describes techniques for associating social data with user profiles. In one or more implementations, a social post is targeted to a population of users on a social network. The social post includes a link to a resource, such as a website. The resource is then monitored for user access via the link. When a user accesses the resource, social data corresponding to the social post is associated with a user profile of the user. The social data can include targeting parameters of the social post, such as an age, sex, or location of users to which the social post is targeted. The social data may also include other parameters related to the content of the social post, such as one or more topics of the social post.

20 Claims, 5 Drawing Sheets (56) References Cited

U.S. PATENT DOCUMENTS

| | | | | |
|---|---|---|---|---|
| 2014/0278538 A1* | 9/2014 | Smith | ................ | G06Q 10/0635 |
| | | | | 705/3 |
| 2015/0127748 A1* | 5/2015 | Buryak | ............ | G06F 17/30867 |
| | | | | 709/206 |
| 2015/0199437 A1* | 7/2015 | Sherman | ............ | G06Q 30/0241 |
| | | | | 707/733 |

* cited by examiner

ASSOCIATING SOCIAL DATA WITH USER PROFILES

BACKGROUND

Digital marketers want to create detailed profiles of their customers in order to personalize customer experiences. With social networking becoming a huge store of user profile data, any digital user profile is incomplete without being augmented with social data. However, there is no known way to get access to user social data without the user explicitly logging into the social network.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques for associating social data with user profiles. In one or more implementations, a social post is targeted to a population of users on a social network. The social post includes a link to a resource, such as a website. The resource is then monitored for user access via the link. When a user accesses the resource, social data corresponding to the social post is associated with a user profile of the user. The social data can include targeting parameters of the social post, such as an age, sex, or location of users to which the social post is targeted. The social data may also include other parameters related to the content of the social post, such as one or more topics of the social post.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

With social networking becoming a huge store of user profile data, any digital user profile is incomplete without being augmented with social data. However, there is no known way to get access to user social data without the user explicitly logging into the social network. This document describes techniques for associating social data with user profiles. The social data can be derived from user interactions with social posts published on social networks.

In one or more implementations, a social post is targeted to a population of users on a social network. The social post includes a link to a resource, such as an external website. For example, if the social post is published by a women's fitness company describing a pair of running shoes, the link may be to a website at which the running shoes may be purchased. The link is parameterized to uniquely identify the social post.

The resource is then monitored for user access. When a user accesses the resource via the link, it can be inferred that the user accessed the resource via selection of the link in the social post because the link is parameterized to uniquely identify the social post. As such, it can be determined with a high degree of confidence that the user is a member of the population to which the social post was targeted, and that the user is interested in one or more topics related to the social post.

As such, social data corresponding to the social post can be associated with a user profile of each user that accesses the resource. In one or more implementations, the parameters include targeting parameters of the social post, such as an age, sex, or location of users to which the social post was targeted. Other parameters related to the social post may also be associated with the user profile, such as one or more topics of the social post.

Continuing with the example above, consider that the social post by the women's fitness company is targeted to women, between the ages of 25 and 34, who live in San Francisco, Calif. In this case, because the link uniquely identifies the social post, it can be determined that a user that accesses the resource is a woman, between the ages of 25 and 34, who lives in San Francisco, Calif. Similarly, because the social post is directed to fitness and running, it can be further determined that the user that accesses resource is interested in fitness and running. Thus, a user profile of the user can be enriched to include information identifying the user as a woman, between the ages of 25 and 34, who lives in San Francisco, Calif. and is interested in fitness and running.

It is to be appreciated, therefore, that the techniques described herein enable information derived from social networks to be associated with user profiles without the need to specifically access this information from the social networks to which the content is posted. This enables generation of dynamic and rich user profiles, which can then be used by brands to enrich and personalize user experiences.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
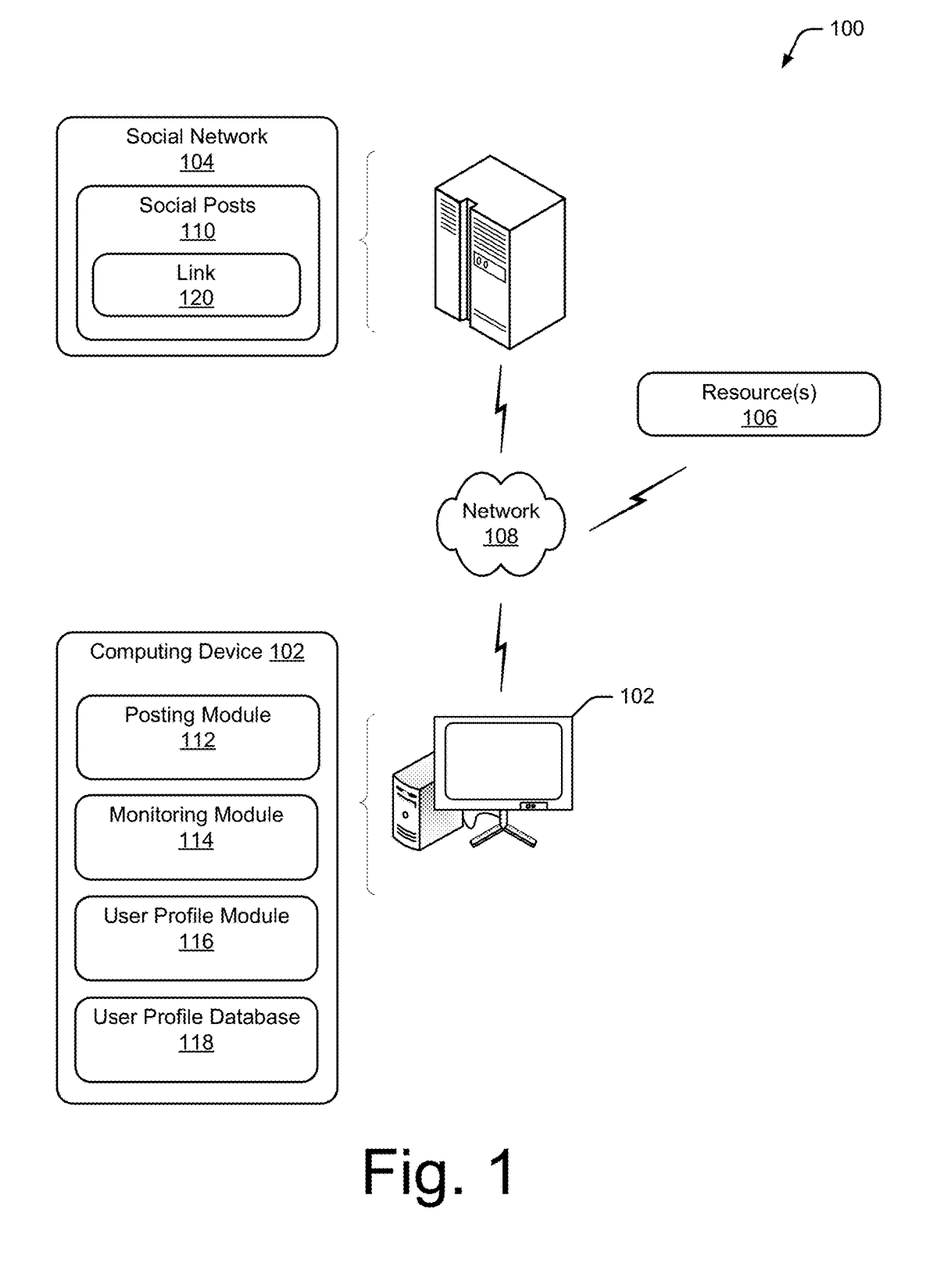
FIG. 1 illustrates an environment in an example implementation that is operable to employ techniques described herein.

FIG. 1 illustrates an environment 100 in an example implementation that is operable to employ techniques described herein. Environment 100 includes a computing device 102, a social network 104, and a resource 106 that are communicatively coupled via a network 108. As described herein, resource 106 may be configured as any type of online resource, such as a website. Computing device 102 and social network 104 may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to low-resource devices with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 5.

Although network 108 is illustrated as the Internet, the network may assume a wide variety of configurations. For example, network 108 may include a wide area network (WAN), a local area network (LAN), a wireless network, a public telephone network, an intranet, and so on. Further, although a single network 108 is shown, network 108 may also be configured to include multiple networks.

Social network 104 provides an interface (not shown) for multiple users to interact with a social network community over network 108. As described herein, a social network may include blogs and online forums, social media sharing services, social networking services, and social news services.

Social media sharing services can include video services (e.g., YouTube® and Vimeo®), photo services (e.g., Flickr®, Picasa®, and Instagram®), audio services (e.g., Pandora® and LastFM®), and bookmark services (e.g., StumbleUpon® and Delicious®). Example of social networking services include Facebook®, Google+®, Twitter®, LinkedIn®, Plurk®, and Xing®. Examples of social news services include Digg® and Reddit®.

Social network 104 enables marketers to submit social posts 110 to the social network. As described herein, social posts 110 include any message published to an online forum or newsgroup, a social network platform (e.g., Facebook®, Twitter®, or Instagram®), a blog, or any other type of social network 104. In some cases, social posts 110 may also include responses, comments, or replies to an original social post 110 by users of the social network community.

Computing device 102 is illustrated as including a posting module 112, a monitoring module 114, a user profile module 116, and a user profile database 118. Posting module 112 is configured to enable a marketer to prepare and publish social posts 110 to social network 104. Posting module 112 further enables the marketer to target the social post to a particular population of users on social network 104, and to include a link 120 (e.g., a hyperlink) to resource 106 within the social post. Monitoring module 114 is configured to monitor user access to resource 106, and to determine an identifier (e.g., a cookie) of each user that access resource 106. User profile module 116 is configured to associate social data of social post 110 with a user profile of each user that accesses resource 106 in user profile database 118. Further discussion of the functionality of modules 112, 114, and 116 is discussed below.

Figure 5:
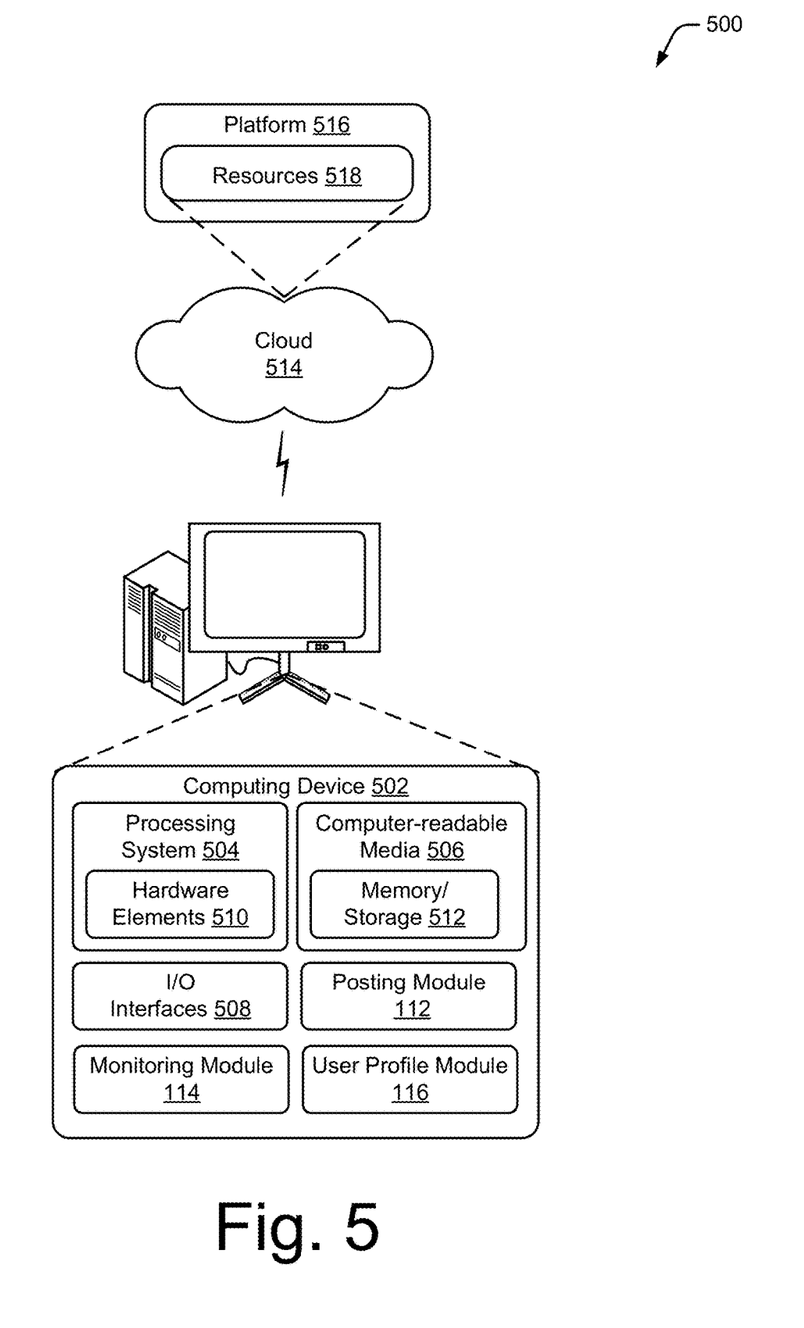
FIG. 5 illustrates an example system including various components of an example device that can be implemented as any type of computing device as described and/or utilized with reference to FIGS. 1-4 to implement embodiments of the techniques described herein.

Although illustrated as part of computing device 102, functionality represented by modules 112, 114, and 116 may be further divided, such as to be performed "over the cloud" by one or more servers that are accessible via network 108, further discussion of which may be found in relation to FIG. 5.

Example Procedure

The following discussion describes techniques for associating social data with user profiles. Aspects of the procedure may be implemented in hardware, firmware, or software, or a combination thereof. The procedure is shown as a set of blocks that specify operations performed by one or more devices and is not necessarily limited to the order shown for performing the operations by the respective blocks. In portions of the following discussion, reference will be made to FIGS. 1, 3, and 4.

Figure 2:
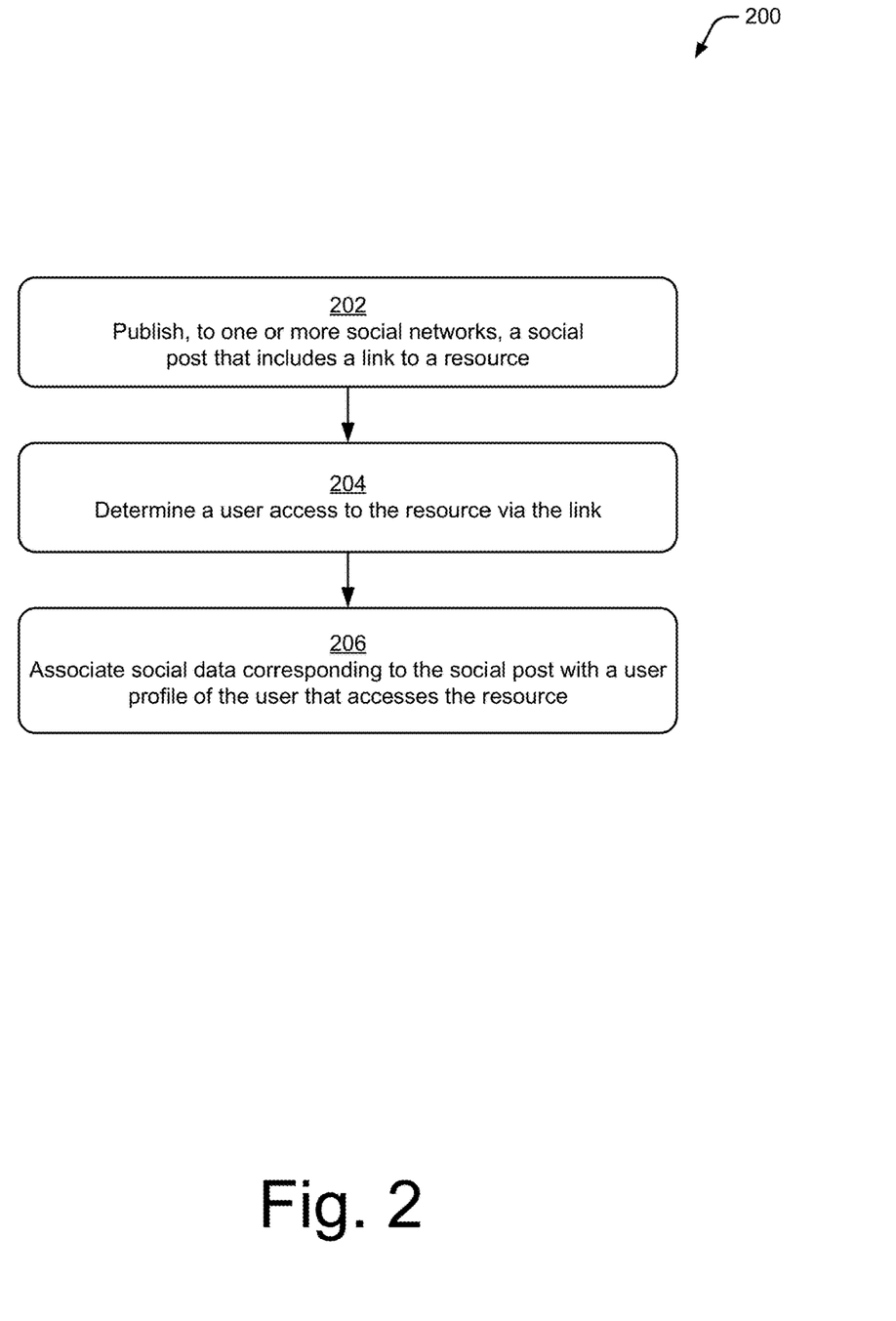
FIG. 2 illustrates a procedure in an example implementation of associating social data with user profiles.

FIG. 2 illustrates a procedure 200 in an example implementation of associating social data with user profiles. At 202, a social post that includes a link to a resource is published to one or more social networks. For example, posting module 112 publishes social post 110 that includes link 120 to resource 106 to one or more social networks 104.

In one or more implementations, social post 110 is published with targeting parameters that target the social post to a population of users of the one or more social networks 104. For example, posting module 112 enables a marketer to target social post 110 to a particular population or demographic of users by providing one or more targeting parameters. In some cases, the marketer can target the social post to users that like or follow a brand page of the marketer. For example, on Facebook® the marketer can publish a social post to the marketer's brand page that will be viewed by users that like the brand page. Alternately or additionally, posting module 112 may enable the marketer to specifically target social post 110 to a particular demographic or population of users. For example, posting module 112 may enable the marketer to provide targeting parameters, such as the age, sex, location, and interests of users of social network 104 to cause this population of users to view social post 110.

Figure 3:
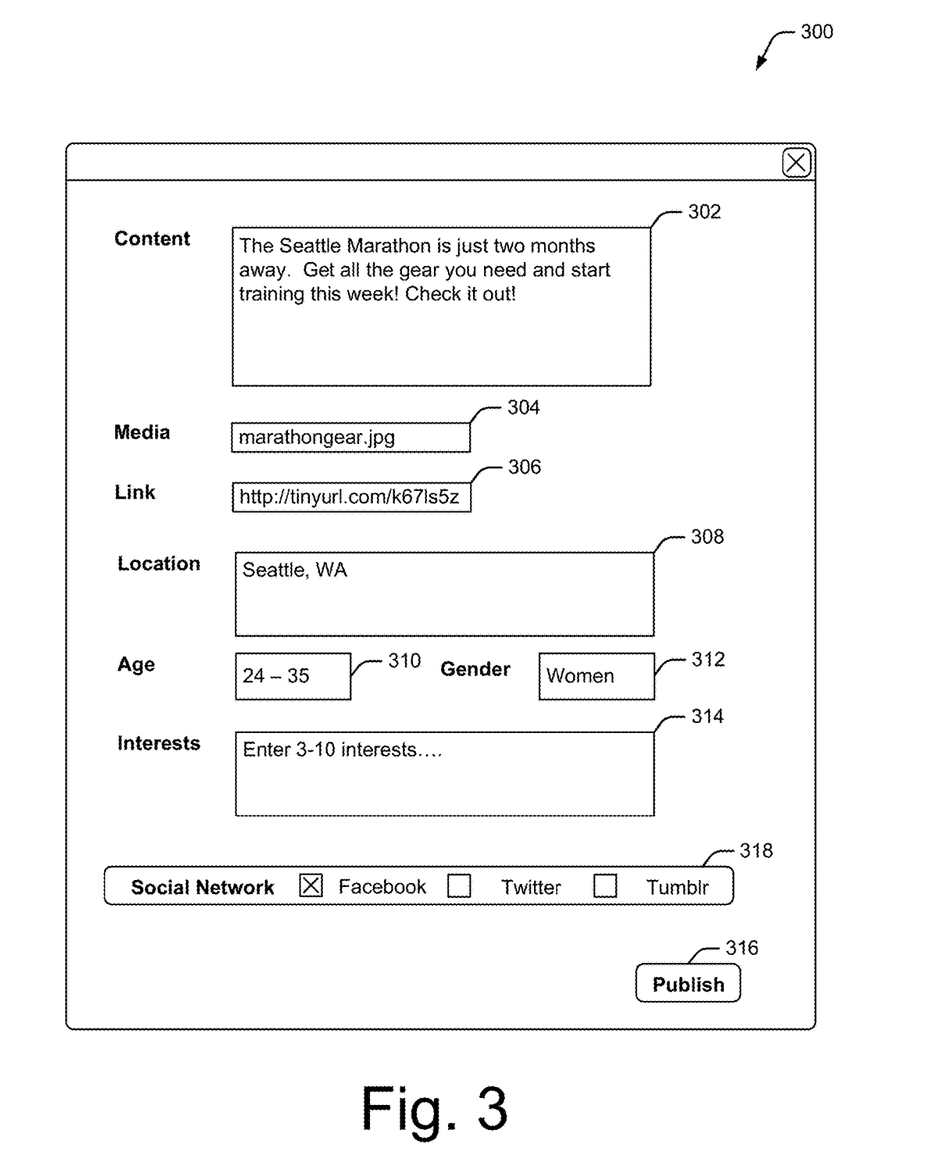
FIG. 3 illustrates an example user interface in accordance with one or more implementations.

FIG. 3 illustrates an example of a user interface 300 rendered by posting module 112 that enables a marketer to prepare and publish a social post 110 one or more social networks 104. In this example, user interface 300 includes a content control 302 which enables a marketer to enter the text of social post 110. In this example, the marketer has entered the following text into content control 302: "The names behind the scenes, now on sweatshirts. Celebrating the labels and producers who helped establish the biggest stars of the last century, Levi's® brings you the Sony Legacy Collection".

User interface 300 further includes a media control 304, which enables the marketer to upload media (e.g., photos or videos) for the social post. In this example, the marketer has uploaded a picture with the filename "sweatshirts.jpg".

User interface 300 further includes a link control 306 which enables the marketer to enter a link (e.g., a hyperlink) to resource 106. In this example, the marketer has entered the link "http://oak.ctx.ly/r/fx90", which links to a website at which users can purchase "Sony Legacy Collection" sweatshirts.

Link 120 can be any type of link to an online resource, such as a URL, a barcode, or a QR code. In one or more implementations, link 120 is parameterized to uniquely identify social post 110. For example, a tracking code may be appended to the link so that there is a 1:1 mapping between social post 110 and link 120. As described in more detail below, this 1:1 mapping enables posting module 112 to infer that a user that accesses resource 106 did so via selection of link 120 in social post 110. In some cases, the link can be a redirect link to an intermediate website that includes a direct link to resource 106. In other cases, the link can link directly to resource 106.

User interface 300 further includes targeting controls which enable the marketer to specify targeting parameters for the social post. In this example, user interface 300 enables the marketer to enter targeting parameters for location, age, gender, and interests, via a location control 308, an age control 310, a gender control 312, and a user interest control 314, respectively. The marketer, in this example, has used targeting controls 308, 310, and 312 to target social post 110 to men, between the ages of 24 and 35, who live in Seattle, Wash. The marketer has not entered any user interests into control 314, but could enter user interests such as clothing, music, sports, and so on.

User interface 300 further includes a publish control 316 and a social network control 318, which can be used by the marketer to publish social post 110 to one or more social networks 104. In FIG. 3, when publish control 316 is selected, social post 110 is published to a population of users on Facebook®, who are men, between the ages of 25 and 34, and live in Seattle, Wash.

Figure 4:
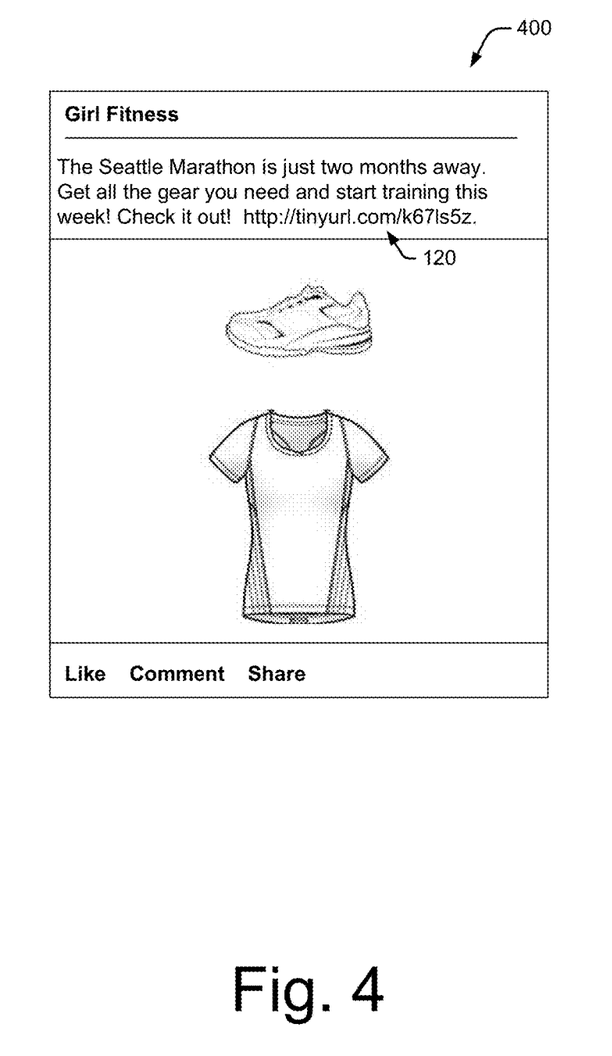
FIG. 4 illustrates an example of a published social post in accordance with one or more implementations.

FIG. 4 illustrates an example of a published social post 400 that was prepared and published using user interface 300. In this example, social post 400 includes an identifier of the company or brand associated with the social post ("Levi's"), text of the social post, the sweatshirt image, and social media sharing controls, such as like, comment, and share. Social post 400 also includes link 120 that can be selected to navigate to resource 106, which in this example is a website at which Sony Legacy Collection sweatshirts may be purchased.

At 204, user access to the resource is monitored. For example, monitoring module 114 monitors user access to resource 106 via link 120. Monitoring module 114 can monitor the user access to resource 106 in multiple different ways. In one or more implementations, link 120 is a redirect link to an intermediate resource that includes a direct link to resource 106. In these cases, monitoring module 114 can monitor user access at a server of the intermediate resource. In other implementations, link 120 can be a direct link to resource 106. In these cases, monitoring module 114 can monitor user access at a server of resource 106.

Monitoring module 114 is further configured to determine a user identifier for each user that accesses resource 106 via link 120. Monitoring module 114 can determine the user identifier using any known processes, such as by identifying a cookie-based visitor identifier in a web browser utilized by the user that accesses resource 106.

At 206, for each user access, social data corresponding to the social post is associated with a user profile of the user. For example, user profile module 116 associates social data corresponding to social post 110 with a user profile of the user in user profile database 118.

The user profile may be an anonymous user profile or a fully-known user profile. As described herein, an anonymous user profile includes data obtained by user actions and interactions with the marketer through various channels. In contrast, a fully-known user profile includes full details provided by the user, such as the user's name, phone number, address, and so on.

In one or more implementations, the user profile includes the user identifier of the user determined by monitoring module 114. For example, user profile module 116 can receive the user identifier of the user from monitoring module 114. User profile module 116 then determines whether the user identifier is already stored in user profile database 118. If the user identifier is not already stored in the user profile database, then user profile module 116 stores the user identifier in user profile database 118 to generate a new user profile for the user. User profile module 116 then associates the social data with the new user profile. Alternately, if the user identifier is already stored in the user profile database with an existing user profile, then user profile module 116 associates the social data with the existing user profile.

In one or more implementations, the social data associated with the user profile in user profile database 118 includes the targeting parameters of social post 110. For example, because link 120 uniquely identifies social post 110, user profile module 116 can infer that the user accessed resource 106 by selecting link 120 in social post 110. Thus, user profile module 116 can determine with a high degree of confidence that the user belongs to the population of users designated by the targeting parameters of social post 110.

Alternately or additionally, the social data associated with the user profile in user profile database 118 may include other parameters related to the content of the social post, such as one or more topics of the social post. For example, because link 120 uniquely identifies social post 110, user profile module 116 can infer that the user accessed resource 106 by selecting link 120 in social post 110. Thus, user profile module 116 can determine with a high degree of confidence that the user is interested in one or more topics that social post 110 discusses.

Consider, for example, that a user accesses link 120 displayed in social post 400. In this example, due to the targeting parameters of social post 400, user profile module 116 can determine that a user that accesses the resource is a male, between the ages of 24 and 35, who lives in Seattle, Wash. Further, because social post 400 is directed to the topics of men's sweatshirts and Sony music, posting module 112 can determine that the user is interested in the topics of men's sweatshirts and Sony music. Thus, user profile module 116 can enrich the user profile to indicate that the user is a male, between the ages of 24 and 35, who lives in Seattle, Wash., and is interested in men's sweatshirts and Sony music.

It is to be appreciated that targeting parameters and topics of the social post are just examples of the types of social data that can be associated with a user profile. User profile module 116 is configured to associate any type of social data related to the social post 110, such as a time that the social post was posted, which social network the social post was posted to, and the like.

Having described example procedures in accordance with one or more implementations, consider now an example system and device that can be utilized to implement the various techniques described herein.

Example System and Device

FIG. 5 illustrates an example system generally at 500 that includes an example computing device 502 that is representative of one or more computing systems and/or devices that may implement the various techniques described herein. This is illustrated through inclusion of posting module 112, monitoring module 114, and user profile module 116, which operate as described above. The computing device 502 may be, for example, a server of a service provider, a device associated with a client (e.g., a client device), an on-chip system, and/or any other suitable computing device or computing system.

The example computing device 502 is illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device implementation, implementation of functionality described herein may be distributed throughout the system 500. For example, the functionality may be implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
receiving targeting parameters for a social post, the targeting parameters including at least one of an age, a sex, a location, or an interest of a population of users to which the social post is targeted;
publishing the social post with the targeting parameters to at least one social network to target the population of users, the social post including a link to a resource;
determining a user access to the resource via the link by detecting a tracking code that is appended to the link and uniquely mapped to the social post; and
associating the targeting parameters of the social post with a user profile associated with the user access to the resource.

2. The computer-implemented method of claim 1, further comprising analyzing the text of the social post to determine at least one topic of the social post, wherein the associating further comprises associating the at least one topic of the social post with the user profile.

3. The computer-implemented method of claim 1, wherein the social data associated with the user profile is derived from user interactions with the social post.

4. The computer-implemented method of claim 1, further comprising appending the tracking code to the link to uniquely identify the social post.

5. The computer-implemented method of claim 4, wherein detection of the tracking code enables user access to the resource via the link to be distinguished from other user access to the resource.

6. The computer-implemented method of claim 1, wherein the link is a redirect link to an intermediate resource that includes a direct link to the resource.

7. The computer-implemented method of claim 1, further comprising:
determining a user identifier of a user that accesses the resource via the link;
determining if the user identifier is associated with an existing user profile; and
wherein the associating further comprises:
responsive to determining that the user identifier is associated with the existing user profile, associating the social data corresponding to the social post with the exiting user profile; or
responsive to determining that the user identifier is not associated with the existing user profile, generating a new user profile, and associating the social data corresponding to the social post with the new user profile.

8. The computer-implemented method of claim 1, wherein the user profile comprises an anonymous user profile.

9. The computer-implemented method of claim 1, wherein the user profile comprises a fully-known user profile.

10. The computer-implemented method of claim 1, wherein the targeting parameters for the social post are specified, via a user interface, by a user that generates the social post for publishing.

11. At least one computer-readable storage medium comprising instructions stored thereon that, responsive to execution by a computing device, cause the computing device to implement a user profile module, the user profile module configured to perform operations comprising:
receiving a user identifier of a user that accesses a resource via a link included in a social post that is published, on a social network, with targeting parameters that describe a population of users on the social network to which the social post is targeted, the link including a tracking code that uniquely identifies the social post; and
associating social data corresponding to the targeting parameters of the social post with a user profile of the user in a user profile database.

12. The at least one computer-readable storage medium as recited in claim 11, wherein the targeting parameters include at least one of an age, sex, location, or interests of users of the social network.

13. The at least one computer-readable storage medium as recited in claim 11, wherein the social data associated with the user profile includes at least one of the targeting parameters of the social post and at least one topic of the social post.

14. The at least one computer-readable storage medium as recited in claim 11, wherein the user profile module is further configured to determine that the user accessed the resource via the link by detecting the tracking code appended to the link.

15. The at least one computer-readable storage medium as recited in claim 11, wherein the targeting parameters are specified by a user that generated the social post.

16. A computing device comprising:
   at least a memory and a processor to implement a user profile module, the user profile module configured to:
   monitor a resource for user access;
   in response to detecting user access of the resource:
      determine a user identifier of a user that accessed the resource;
      determine that the user accessed the resource via a link included in a social post published on a social network by identifying a tracking code of the link that is uniquely mapped to the social post; and
      determining at least one targeting parameter associated with the social post, the at least one targeting parameter including information describing a target demographic of the social post; and
      associate the at least one targeting parameter with a user profile of the user in a user profile database associated with the resource.

17. The computing device of claim 16, wherein the social post is published on the social network with the at least one targeting parameter to target the social post to a particular population of users, defined by the target demographic, of the social network.

18. The computing device of claim 17, wherein the social data associated with the user profile includes the at least one targeting parameter of the social post and at least one topic of the social post.

19. The computing device of claim 16, wherein the at least one targeting parameter includes at least one of an age, sex, location, or interests of users of the social network.

20. The computing device of claim 16, wherein the at least one targeting parameter associated with the social post are specified by a user that generated the social post.

* * * * *